(12) United States Patent
Huang

(10) Patent No.: US 8,297,118 B2
(45) Date of Patent: Oct. 30, 2012

(54) TIRE PRESSURE GAUGE AND FASTENING AND UNFASTENING TOOL OF THE SAME

(75) Inventor: Wen-Huo Huang, Hsinchu County (TW)

(73) Assignee: Sung Jung Minute Industry Co., Ltd., Hsinchu County (TW)

( * ) Notice: Subject to any disclaimer, the term of this patent is extended or adjusted under 35 U.S.C. 154(b) by 108 days.

(21) Appl. No.: 12/974,973

(22) Filed: Dec. 21, 2010

(65) Prior Publication Data

US 2012/0152009 A1 Jun. 21, 2012

(51) Int. Cl.
*B60C 23/04* (2006.01)
(52) U.S. Cl. ...................................... 73/146.8
(58) Field of Classification Search .......... 73/146–146.8
See application file for complete search history.

(56) References Cited

U.S. PATENT DOCUMENTS

| | | | | |
|---|---|---|---|---|
| 6,125,694 | A * | 10/2000 | Bledsoe | 73/146.8 |
| 7,024,928 | B1 * | 4/2006 | Chen | 73/146.8 |
| 2002/0139288 | A1 * | 10/2002 | Evans et al. | 116/34 R |
| 2004/0025582 | A1 * | 2/2004 | Wiseman et al. | 73/146.8 |
| 2004/0261513 | A1 * | 12/2004 | Wiseman et al. | 73/146 |
| 2006/0277988 | A1 * | 12/2006 | Huang | 73/146.8 |
| 2007/0295057 | A1 * | 12/2007 | Tipler et al. | 73/23.39 |
| 2009/0107229 | A1 * | 4/2009 | Bucknell | 73/146.8 |
| 2010/0229640 | A1 * | 9/2010 | Bucknell | 73/146.8 |

FOREIGN PATENT DOCUMENTS

| | | |
|---|---|---|
| TW | M286138 | 1/2006 |
| TW | M362770 | 8/2009 |
| TW | M387012 | 8/2010 |

* cited by examiner

*Primary Examiner* — Andre Allen
(74) *Attorney, Agent, or Firm* — Muncy, Geissler, Olds & Lowe, PLLC

(57) ABSTRACT

A tire pressure gauge includes a holder, an air intake seat, and a detection device coupled with the air intake seat. The holder and air intake seat have respectively a first positioning ring and a second positioning ring. A fastening and unfastening tool of the tire pressure gauge includes an outer barrel and an inner barrel held in the outer barrel. The outer barrel has a first anchor portion to latch the first positioning ring. The inner barrel has a second anchor portion to latch the second positioning ring. The outer barrel and inner barrel respectively drive the holder and air intake seat to be fastened to an air nozzle of a vehicle tire, and the holder and air intake seat are butted tightly to allow the tire pressure gauge to be securely installed on the air nozzle of any type of vehicles through the fastening and unfastening tool.

4 Claims, 9 Drawing Sheets

TIRE PRESSURE GAUGE AND FASTENING AND UNFASTENING TOOL OF THE SAME

FIELD OF THE INVENTION

The present invention relates to a tire pressure gauge and a fastening and unfastening tool thereof, particularly to a tire pressure gauge to detect the tire pressure of vehicle wheels and a fastening and unfastening tool to install and disassemble the tire pressure gauge.

BACKGROUND OF THE INVENTION

Driving safety is the most important issue for drivers in driving. Tire plays an important role in the driving safety, which has to be maintained under a desired tire pressure. Too low or too high tire pressure creates safety concern of driving vehicles. However, the tire pressure cannot be visually judged from outside appearance. In general, drivers have to rely on outside help to determine whether the tire pressure is acceptable, needless to say monitoring condition of the tire pressure during driving. To remedy these problems, various tire pressure identification devices have been developed to detect the condition of the tire pressure.

For instance, R.O.C. patent Nos. M387012, M362770 and M286138 disclose tire pressure gauges which have a common feature of including an air intake seat fastened to an air nozzle, a detection device installed on the air intake seat and a cap located on the air intake seat to cover the detection device. Air in the tire is introduced to the air intake seat to be detected to get the tire pressure.

As each of the aforesaid tire pressure gauges is fastened to the air nozzle through the air intake seat, when a vehicle is moving, the air intake seat is easily loosened due to vibration, and the tire pressure gauge would be come off and cannot be securely fastened to the air nozzle. Moreover, if applying the tire pressure gauge to other special vehicles is desired, such as trucks, trailers and the like, people have to crawl beneath the vehicle chassis to install the tire pressure gauge on the wheel located at the inner side. Installation is inconvenient and troublesome.

SUMMARY OF THE INVENTION

The primary object of the present invention is to solve the aforesaid disadvantages by installing a tire pressure gauge on a wheel air nozzle of any type of vehicles through a mating fastening and unfastening tool to reduce installation difficulty and improve coupling strength between the tire pressure gauge and air nozzle.

To achieve the foregoing object, the present invention provides a tire pressure gauge and a fastening and unfastening tool thereof. The tire pressure gauge includes a holder and an air intake seat mounted on the wheel air nozzle, and a detection device located on the air intake seat. The holder has a first tray which has a first fastening portion fastened to an air nozzle and a first positioning ring located on the circumference thereof. The air intake seat has a second tray and a second fastening portion fastened to the air nozzle to butt the holder, and a second positioning ring on the circumference formed at an outer diameter smaller than the first positioning ring.

The fastening and unfastening tool aims to install the tire pressure gauge on the air nozzle or disassemble therefrom. The fastening and unfastening tool includes an outer barrel, an inner barrel and a driving shaft to couple the outer barrel and inner barrel. The outer barrel has a first housing chamber with a first anchor portion inside to latch the first positioning ring. The inner barrel is held in the first housing chamber and has a second housing chamber to hold the tire pressure gauge with a second anchor portion inside to latch the second positioning ring. The driving shaft includes an outer tube and an inner tube held in the outer tube. The outer tube and inner tube are coupled respectively with the outer barrel and inner barrel to drive respectively the outer barrel and inner barrel to rotate. Thus, through the outer barrel and inner barrel, the holder and air intake seat can be driven respectively to be fastened to the air nozzle of the wheel, and the holder and air intake seat can be butted tightly to overcome the constraint of small installation room, and the fastening and unfastening tool can be used to install the tire pressure gauge securely on the wheel air nozzle of any type of vehicles.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
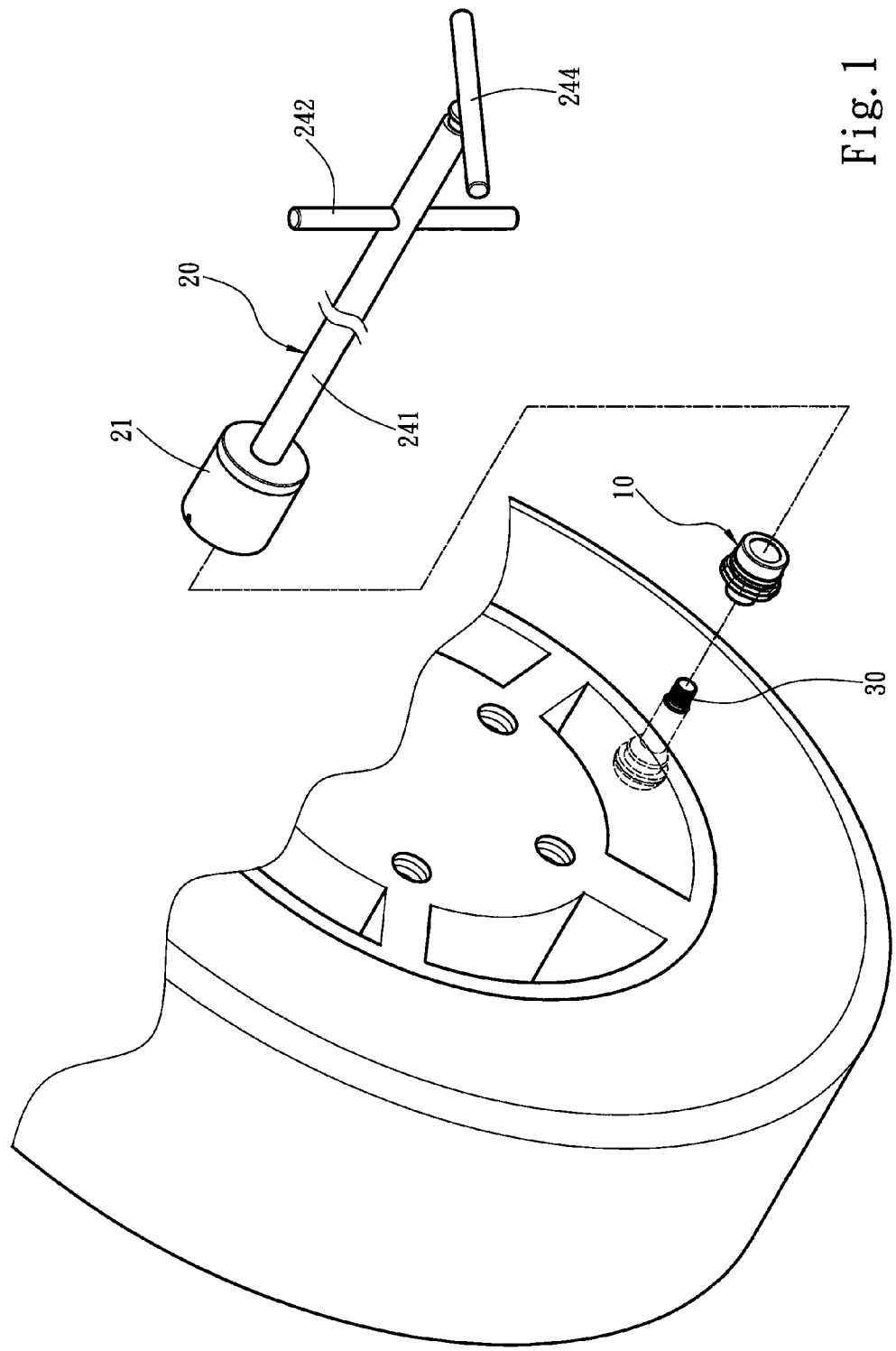
FIG. 1 is a schematic view of an embodiment of the invention.
Figure 2:
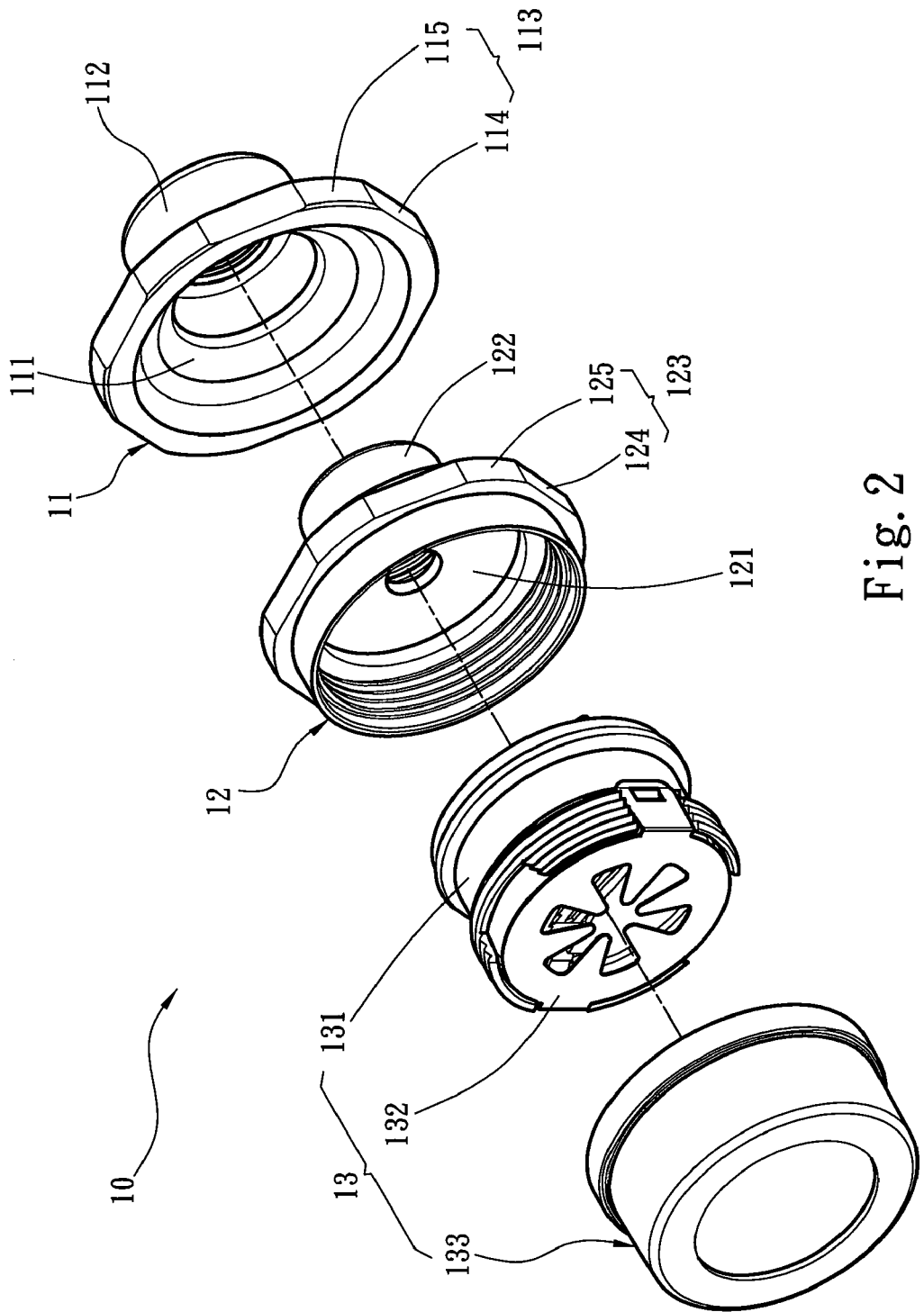
FIG. 2 is an exploded view of the tire pressure gauge of the invention.
Figure 3:
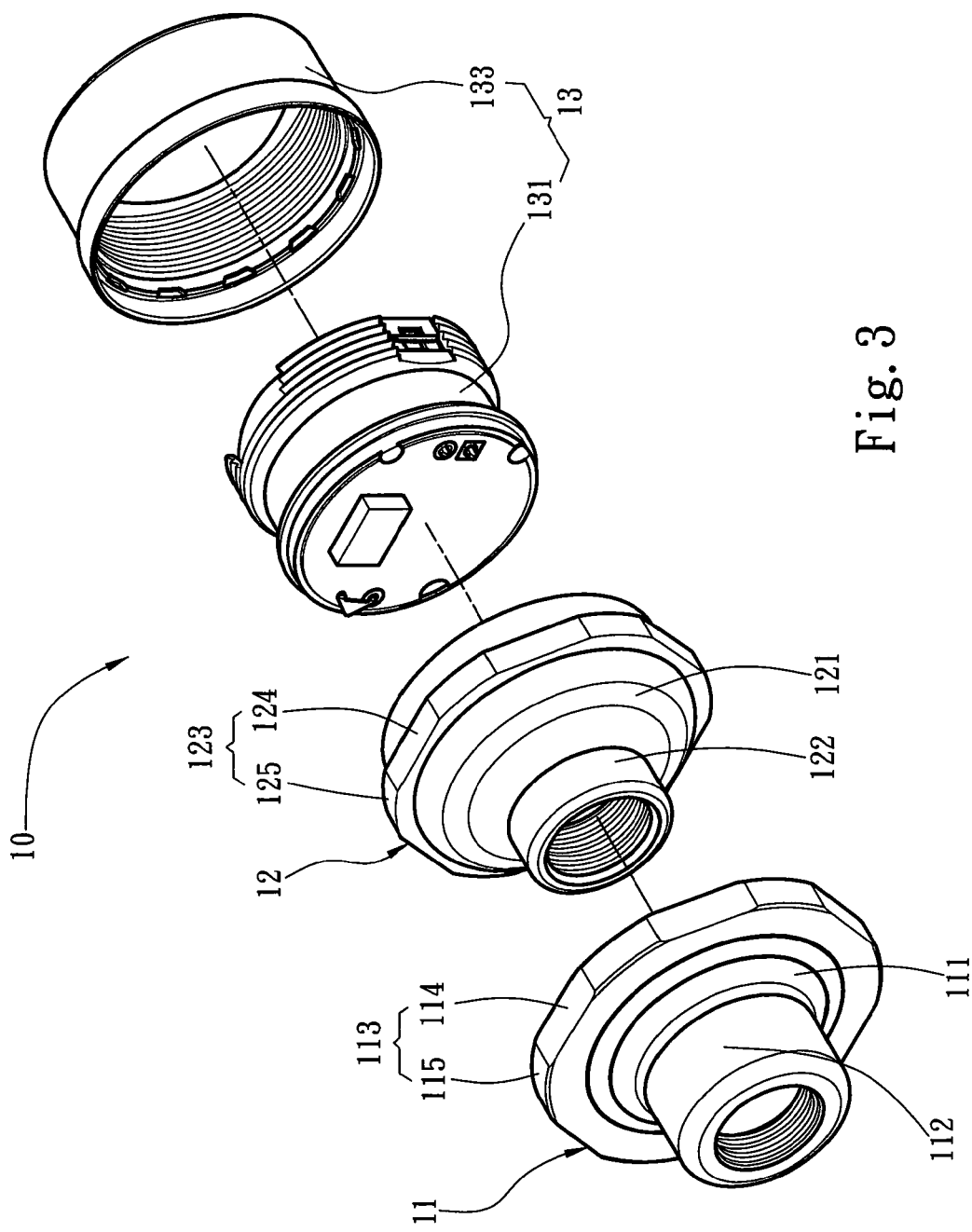
FIG. 3 is another exploded view of the tire pressure gauge of the invention.
Figure 4:
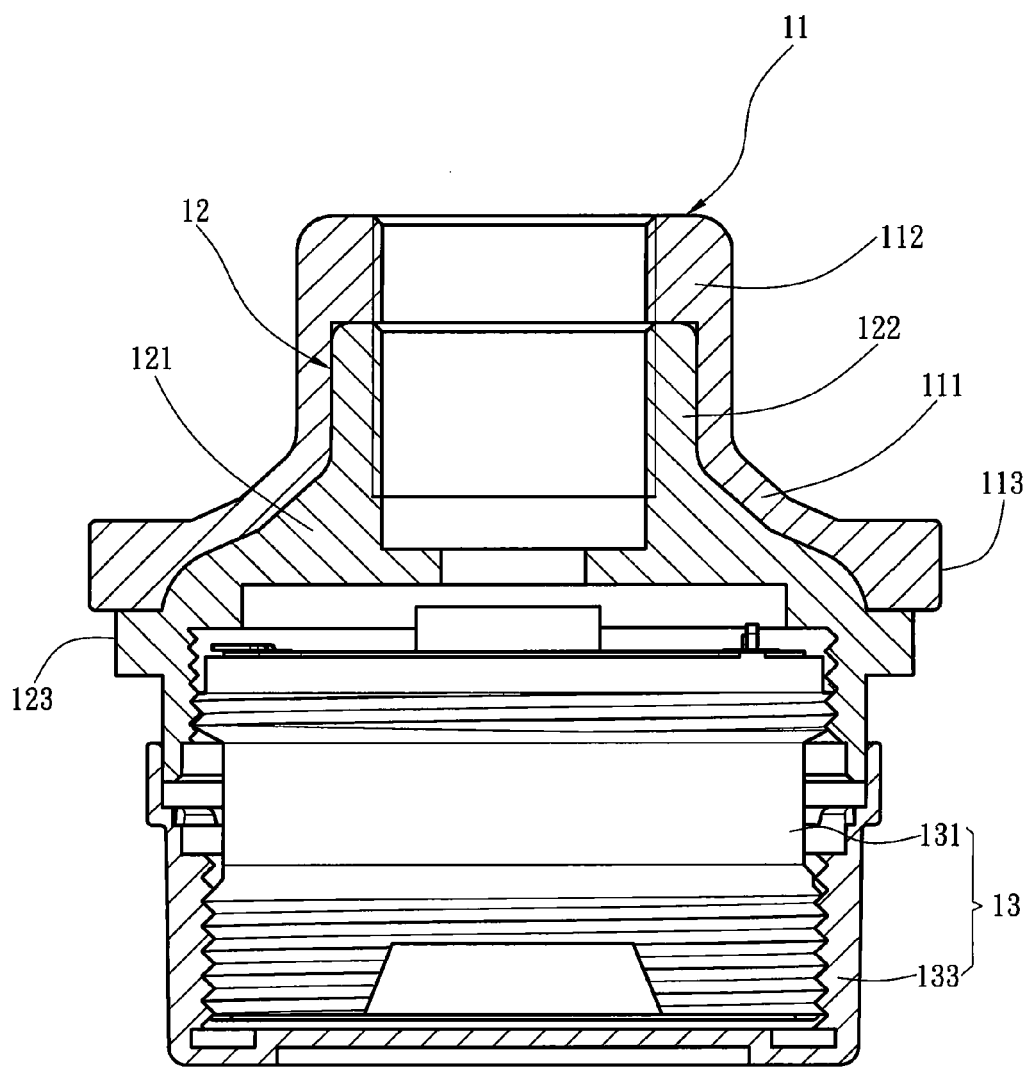
FIG. 4 is a sectional view of the tire pressure gauge of the invention.

Referring to FIG. 1, the present invention aims to provide a tire pressure gauge 10 and a fastening and unfastening tool 20 thereof to install the tire pressure gauge 10 on an air nozzle 30 of a wheel or disassemble therefrom. The tire pressure gauge 10 can detect the internal pressure of the tire. Also referring to FIGS. 2, 3 and 4, the tire pressure gauge 10 includes a holder 11 and an air intake seat 12 mounted in this order onto the air nozzle 30, and a detection device 13 located on the air intake seat 12. The holder 11 has a first tray 111 with a first fastening portion 112 fastened to the air nozzle 30 and a first positioning ring 113 located on the circumference thereof. The air intake seat 12 has a second tray 121 with a second fastening portion 122 fastened to the air nozzle 30 and a second positioning ring 123 on the circumference formed at an outer diameter smaller than the first positioning ring 113. The first and second positioning rings 113 and 123 have respectively a plurality of plane sections 114 and 124 to form a polygonal structure. Any two neighboring plane sections 114 and 124 are bridged by a cambered section 115 or 125. The detection device 13 includes a two-way hub 131 coupled with the air intake seat 12 and a cap 133 coupled with the two-way hub 131. The two-way hub 131 contains a detection assembly 132 to detect the internal pressure of a tire.

Figure 5:
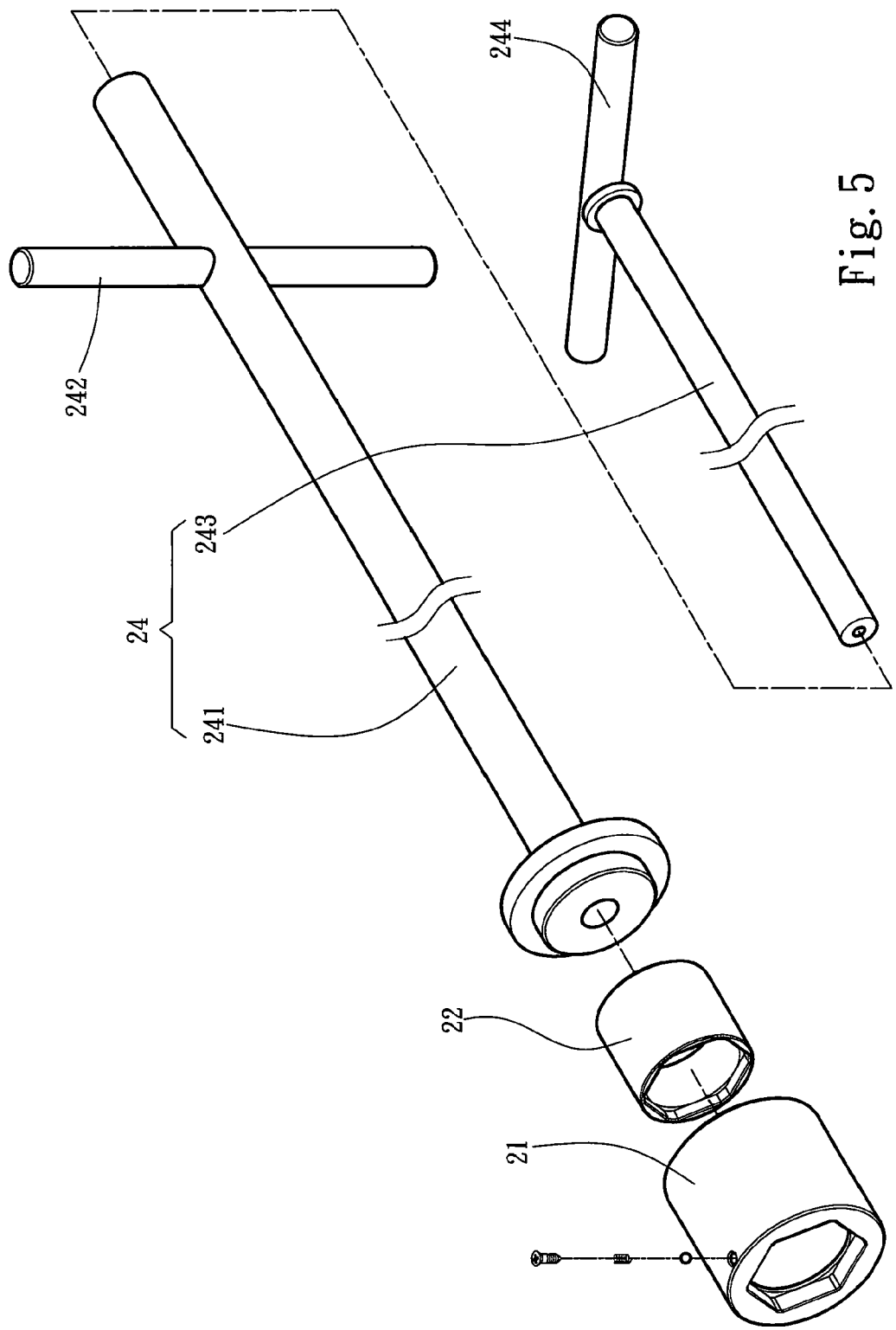
FIG. 5 is an exploded view of the fastening and unfastening tool of the invention.
Figure 6:
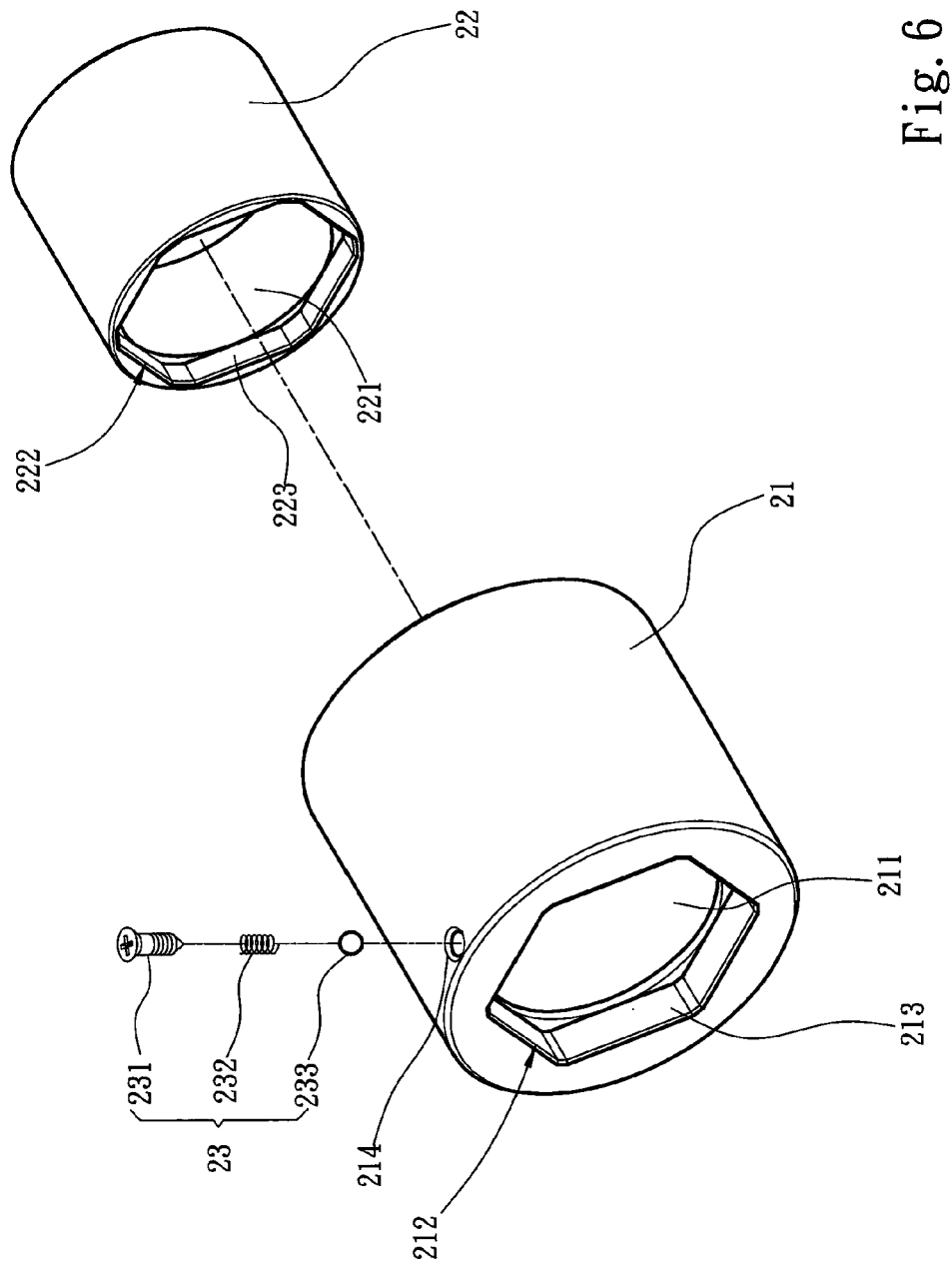
FIG. 6 is another exploded view of the fastening and unfastening tool of the invention.

Also referring to FIGS. 5 and 6, the fastening and unfastening tool 20 includes an outer barrel 21, an inner barrel 22 and a driving shaft 24 to couple the outer barrel 21 and inner barrel 22. The outer barrel 21 has a first housing chamber 211 with a first anchor portion 212 inside to latch the first positioning ring 113. The first anchor portion 212 has a plurality of first plane portions 213 to latch the plane sections 114 of the first positioning ring 113. The inner barrel 22 is held in the first housing chamber 211 and has a second housing chamber 221 to hold the tire pressure gauge 10 with a second anchor portion 222 inside to latch the second positioning ring 123. The second anchor portion 222 has a plurality of second plane portions 223 to latch the plane sections 124 of the second positioning ring 123. The outer barrel 21 has an aperture 214 to hold a retaining member 23. The retaining member 23 includes a fastening member 231 fastened to the aperture 214, an elastic element 232 coupled with the fastening member 231 and a butting member 233 coupled with the elastic element 232. The elastic element 232 provides an elastic force for the butting member 233 to butt the first positioning ring 113 to confine the tire pressure gauge 10 in the second housing chamber 221. The driving shaft 24 includes an outer tube 241 and an inner tube 243 held in the outer tube 241. The outer tube 241 and inner tube 243 are coupled respectively with the outer barrel 21 and inner barrel 22, and also coupled respectively with a first rotary rod 242 and a second rotary rod 244 to drive respectively the outer tube 241 together with the outer barrel 21 and the inner tube 243 together with the inner barrel 22 to rotate.

Figure 7A:
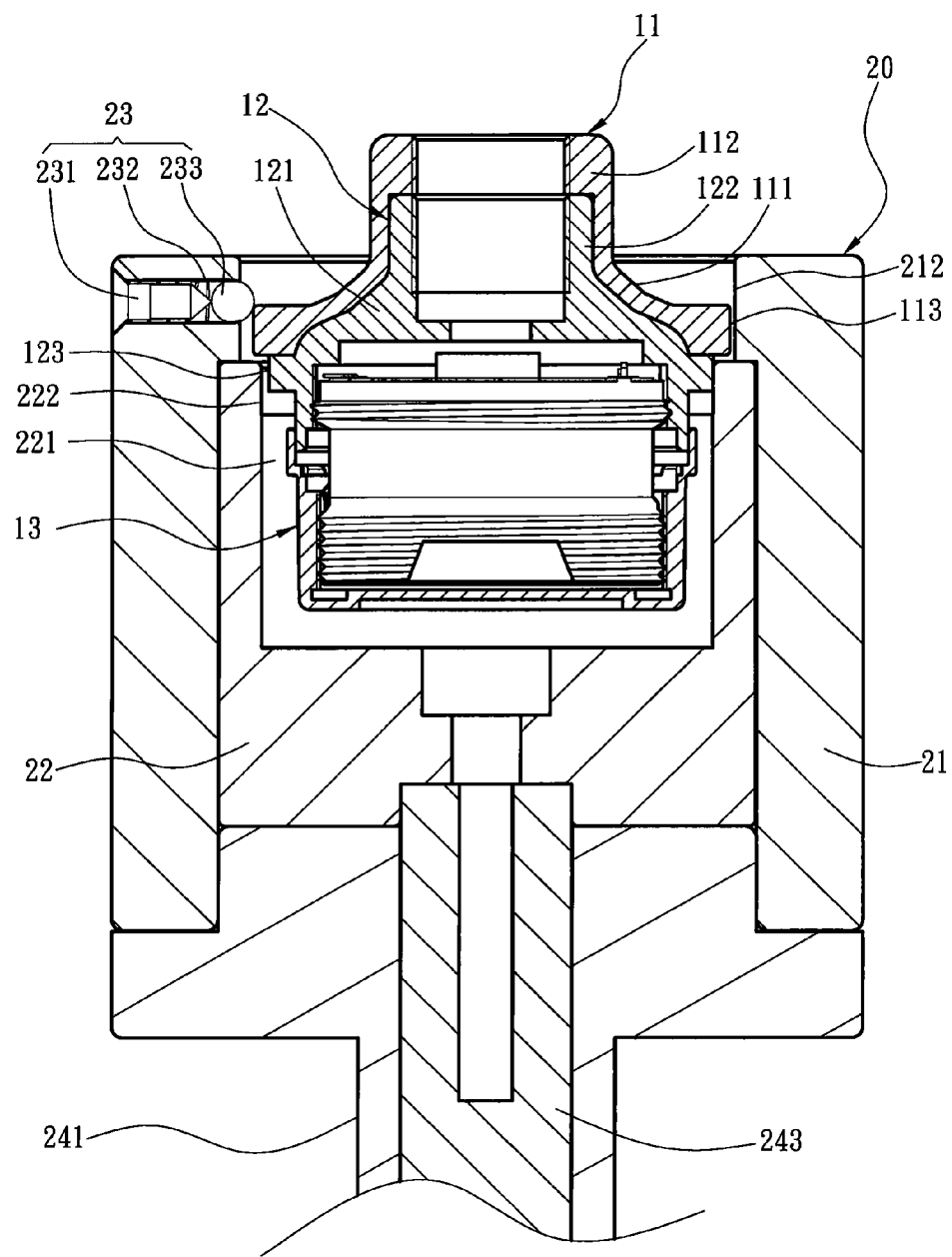
FIGS. 7A through 7C are schematic views of the invention in use conditions.
Figure 7B:
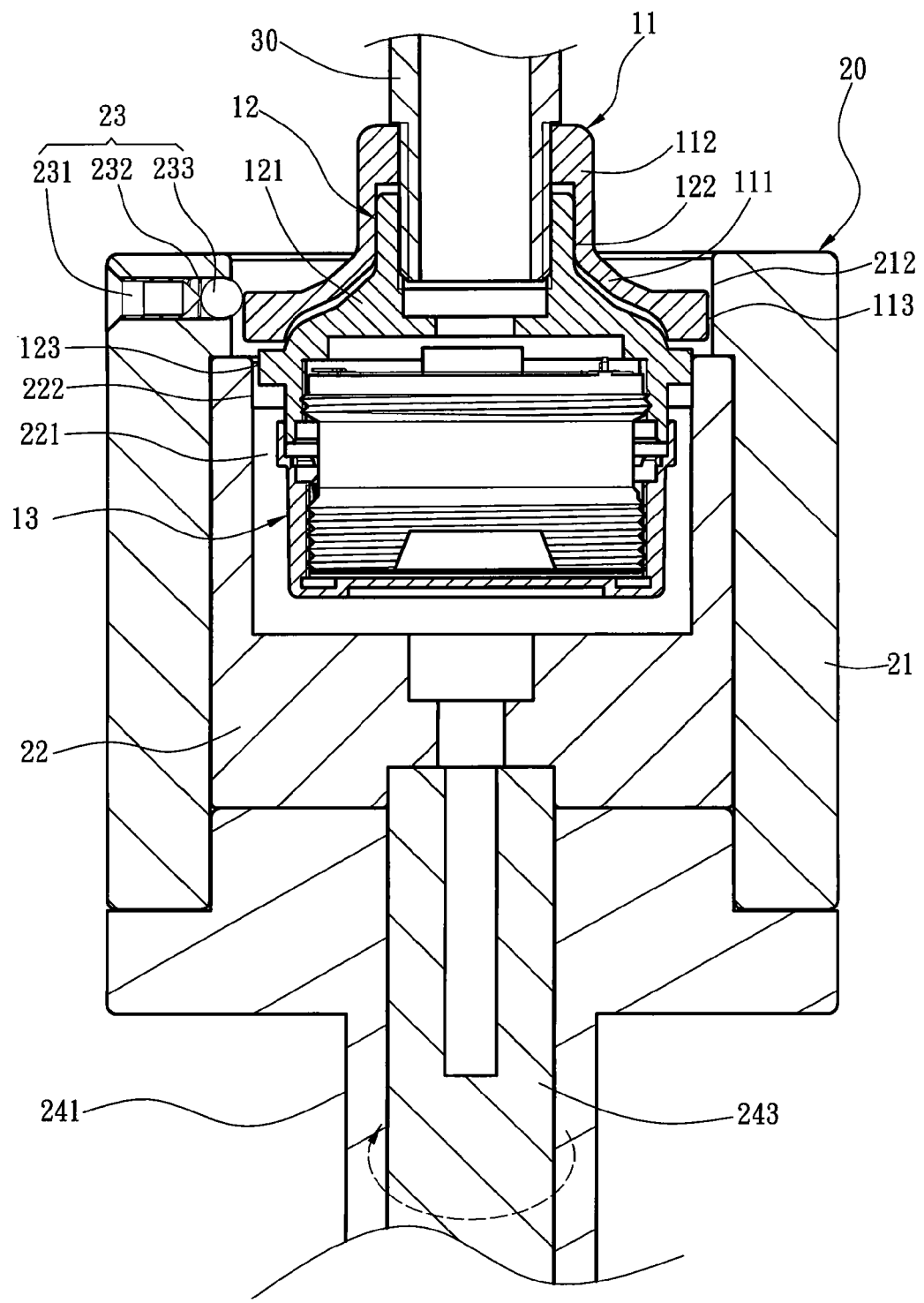
Figure 7C:
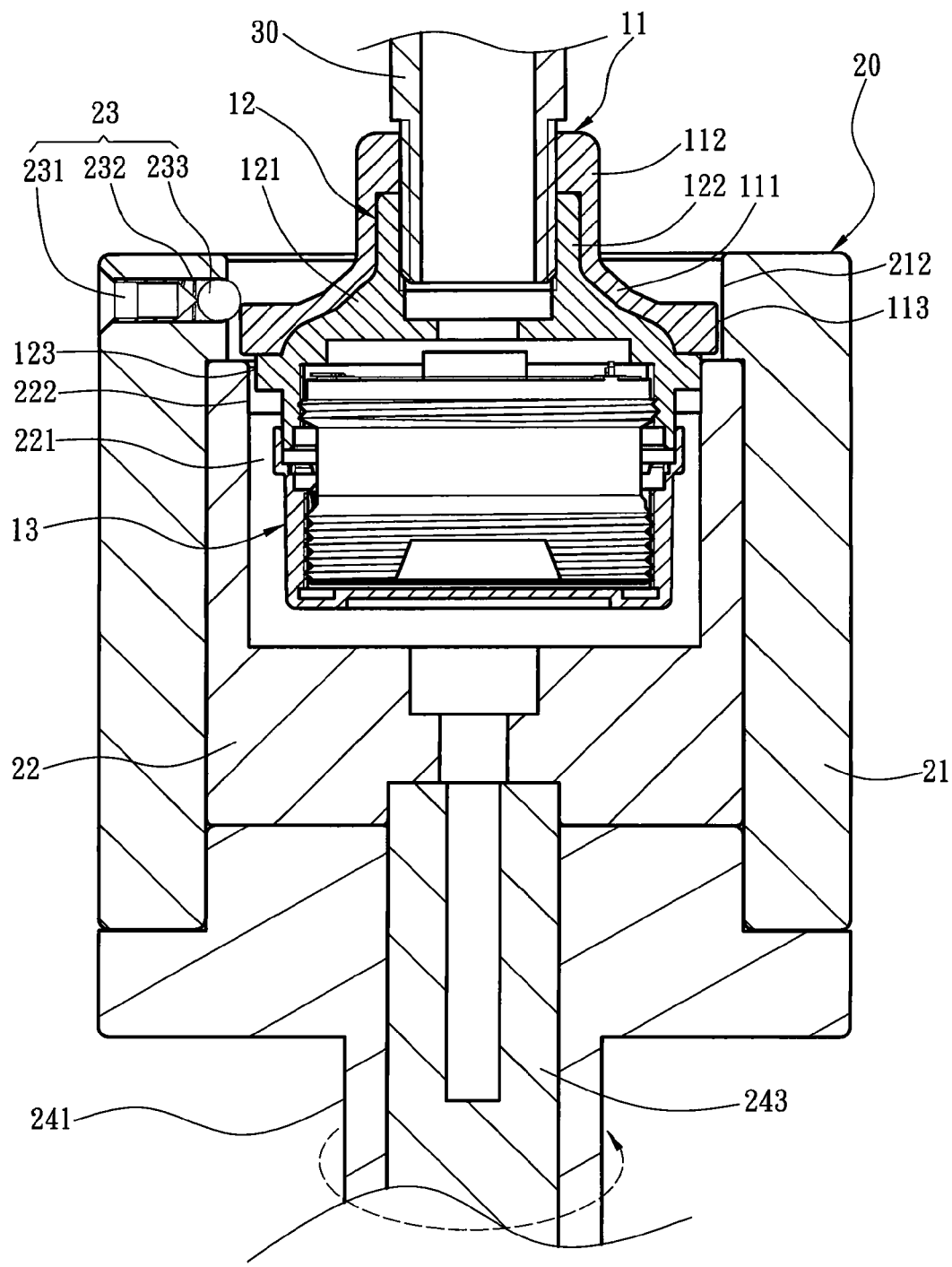

Referring to FIGS. 7A, 7B and 7C, for installing the tire pressure gauge 10 on the air nozzle 30 of the tire, first, place the tire pressure gauge 10 into the second housing chamber 221 of the inner barrel 22 with the retaining member 23 on the outer barrel 21 butting the first positioning ring 113 to prevent the tire pressure gauge 10 from coming off the inner barrel 22 (referring to FIG. 7A); next, align the tire pressure gauge 10 to the air nozzle 30, and turn the second rotary rod 244 and inner tube 243 clockwise so that the inner barrel 22 drives the tire pressure gauge 10 to be fastened to the air nozzle 30 (referring to FIG. 7B); when the air intake seat 12 butts the air nozzle 30, air can be introduced from the interior of the tire to the detection device 13, then turn the first rotary rod 242 and outer tube 241 counterclockwise so that the outer barrel 21 drives the holder 11 outwards to butt the air intake seat 12 to form a tight coupling condition (referring to FIG. 7C). When to disassemble the tire pressure gauge 10 from the air nozzle 30 is desired, implementing the fastening and unfastening tool 20 in the reverse manner.

As a conclusion, the present invention provides the fastening and unfastening tool 20 with the outer barrel 21 and inner barrel 22 latched respectively with the holder 11 and air intake seat 12 of the tire pressure gauge 10 without being constrained by the small installation room, hence the tire pressure gauge 10 can be securely installed on the air nozzle 30 of the tire of any type of vehicles through the fastening and unfastening tool 20. In addition, the tire pressure gauge 10 can only be disassembled through the mating fastening and unfastening tool 20, thus burglarproof effect can also be accomplished.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A tire pressure gauge installed on an air nozzle of a vehicle tire to detect tire pressure inside the tire, comprising:
    a holder including a first tray which includes a first fastening portion fastened to the air nozzle and a first positioning ring located on the circumference thereof;
    an air intake seat including a second tray which includes a second fastening portion fastened to the air nozzle and butted the holder and a second positioning ring on the circumference formed at an outer diameter smaller than the first positioning ring; and
    a detection device coupled with the air intake seat to detect the tire pressure.

2. The tire pressure gauge of claim 1, wherein the first positioning ring and the second positioning ring include respectively a plurality of plane sections to form a polygonal structure.

3. The tire pressure gauge of claim 2, wherein any two neighboring plane sections are bridged by a cambered section.

4. The tire pressure gauge of claim 1, wherein the detection device includes a two-way hub coupled with the air intake seat and a cap coupled with the two-way hub, the two-way hub including a detection assembly.

* * * * *